2,974,175
PROCESS OF PRODUCING ALCOHOL OF IMPROVED ODOR FROM ETHER HYDRATION

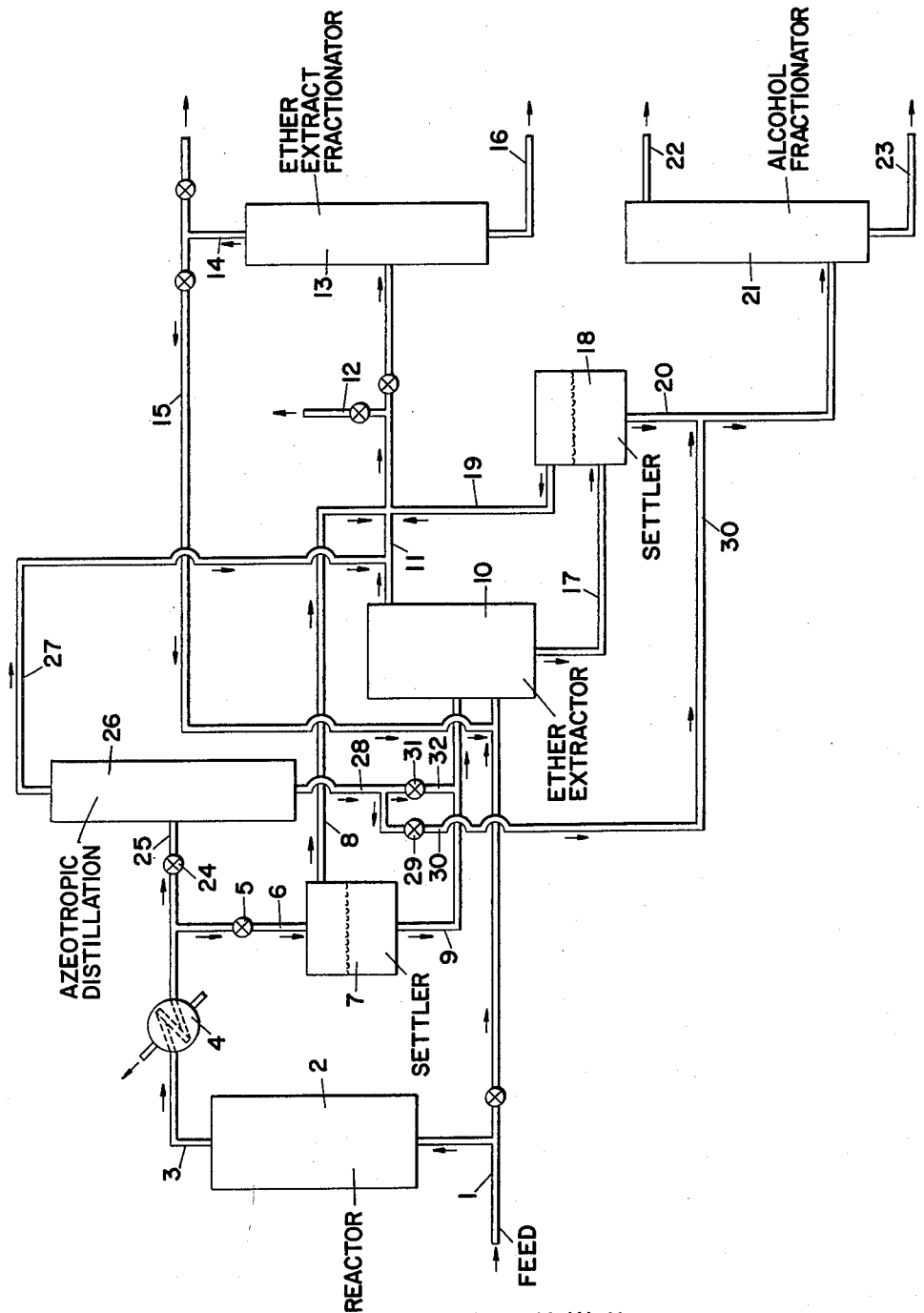

Rhea N. Watts, St. Francisville, and Ralph Burgess Mason, Denham Springs, La., assignors to Esso Research and Engineering Company, a corporation of Delaware Filed Sept. 29, 1958, Ser. No. 764,040

3 Claims. (Cl. 260—632)

This invention relates to an improved process for the removal of polymeric hydrocarbon traces in ethanol produced by the catalytic hydration of diethyl ether.

More particularly, it concerns an ether extraction of such traces prior to the separation of ethanol from the reactor effluent by fractional distillation.

The production of ethyl alcohol, by the hydration of ethylene in the presence of an acid catalyst is accompanied by the formation of approximately 10% to 15% of diethyl ether as a by-product. When market demand for ethanol is unusually high or a lag occurs in ether demand, the ether may be converted to alcohol. However, the ethanol product from the hydration of diethyl ether by conventional procedures has a foul odor due to the presence of polymeric hydrocarbon traces produced in the operation from ethylene regenerated in the hydration process and/or introduced into the hydration process to minimize ethylene regeneration. To the removal of such traces and to the odor they produce, this process is directed.

A process for the production of ethanol by the hydration of diethyl ether is described in detail in U.S. 2,519,061. Briefly, the production of ethyl alcohol from diethyl ether is achieved by passing ether and water under superatmospheric pressures ranging up to 200 atmospheres over a hydration catalyst at temperatures of 350° to 800° F. It is preferred to add ethylene for equilibrium considerations to repress the regeneration of olefin from alcohol or ether during the conversion. The hydration catalysts suitable for this process include difficultly reducible hydrous oxides such as alumina, silica, silica-alumina mixtures, silica-alumina complexes such as the zeolites, molecular sieves, etc., zirconia, molybdenum oxide, tungsten oxide, chromia, etc., or combinations of oxides such as nickel oxide on alumina, or modifications of these oxides such as oxide-salt compositions, e.g., alumina-aluminum sulfate.

The reaction products from such a process are removed overhead and are made up of alcohol, unconverted ether, water, olefin gas and polymeric hydrocarbon traces. The olefin gas may be drawn off and recycled to the reactor or it may be removed from such a system with an ether purge. The polymer although having a relatively high boiling point azeotropes with an ethanol-water mixture and, in the absence of agitation, the polymer is associated with the aqueous alcohol layer in a settling tank even when an ether-rich upper layer is present.

It has now been discovered that the objectionable hydrocarbons and their resulting odors may be effectively removed by a process involving an ether extraction whereby these hydrocarbons are selectively absorbed by diethyl ether and separated from the aqueous ethanol portion of the effluent prior to sending the ethanol to an alcohol fractionator, thereby producing an ethanol substantially free of objectionable odors without any significant loss of ethanol product.

To illustrate the invention, reference is made to the accompanying drawing which represents diagrammatically in elevational cross section alternate flow plans for carrying out the process.

Referring specifically to the drawing, ether vapor and steam in a water to ether ratio of about 2:1 to about 10:1, preferably about 4:1 to 6:1, are fed through line 1 to reactor 2 which consists of a vessel containing catalyst bed or catalyst suspension of a catalyst of the type hereinbefore described. The reactor is operated at temperatures between 350° F. and 800° F., preferably 600° to 650° F., and at pressures ranging from atmospheric to 200 atmospheres, preferably 100 p.s.i.g. to 200 p.s.i.g. The reaction products are taken overhead through line 3 and enter heat exchanger 4. At this point three alternatives are available. If valve 24 is closed and valve 5 is left open the entire effluent stream passes through line 6 into settler 7. Conditions in reactor 2 may be controlled to vary the respective amounts of the products which comprise the effluent. Operating under the preferred conditions hereinbefore set forth the effluent contains about 55 to 65 vol. percent water, about 5 to 15 vol. percent diethyl ether, about 25 to 35% ethyl alcohol together with the aforementioned hydrocarbon traces. If total condensation is effected the effluent will separate into an upper ether-rich phase and a lower alcohol-rich phase in settler 7. Condensation conditions, however, may be controlled so as to maintain essentially a single liquid phase in settler 7 with some diethyl ether in vapor phase. If desired, any conventional agitation means may be interposed between heat exchanger 4 and settler 7. The upper or ether-rich phase in 7 may be withdrawn via line 8 to be eventually purged via line 12 or is passed through ether extract fractionator 13. The lower or alcohol-rich layer in a water to alcohol ratio of about 1.5:1 to 3:1, preferably about 2:1, is removed from 7 as bottoms via line 9 and enters ether extractor 10 into which ether feed from line 1 or recycle ether via lines 15 and 1 or ether from any other source is admitted. Diethyl ether is relatively insoluble in water; at room temperature diethyl ether dissolves 1 to 1.5% of water and water dissolves about 7.5% of ether. To minimize alcohol loss in this extraction the ether feed preferably is saturated with water prior to extraction. Excess water may be employed if desired. The ratio of the aforementioned ether-water feed to said alcohol-rich layer fed to the ether extractor 10 should be from about 1:10 to about 4:10 preferably about 1.5:10 to about 3:10. Ether extractor 10 maintained preferably at room temperature is preferably equipped with a conventional means of agitation such as a recycle pump or a mechanically driven rotary agitator. Ether extract containing the polymer and a small amount of alcohol is withdrawn via line 11 from whence it is purged via line 12 or passed to ether extract fractionator 13. If it be desired to recover the relatively small amount of ethanol in this stream, a water scrubber may be interposed between ether extractor 10 and ether extract fractionator 13 and the alcohol-water bottoms therefrom sent to the alcohol fractionation system hereinafter described. The ether extract purged via line 12 may be used as a gasoline blending stock for the production of high octane number motor fuels. Ether is removed from ether extract fractionator 13 via line 14 from which it may either be purged or recycled via lines 15 and 1 to ether extractor 10. The higher boiling polymer is removed as bottoms via line 16. The alcohol-water bottoms of extractor 10 are removed via line 17 and passed to settler 18 where the stream is again allowed to separate into two liquid phases. If ether is present in the alcohol-water stream entering settler 18, it is removed from 18 via line 19 which feeds into line 11. The alcohol-water bottoms from settler 18 are removed via line 20 and passed to alcohol fractionator 21 from which purified ethanol is removed as a distillate via line 22 and water is drawn off via line 23.

In an alternative procedure, valve 5 may be closed and valve 24 opened to allow the effluent stream to pass through line 25 to azeotropic distillation tower 26 where ether and an ethanol-water-polymer azeotrope and a small additional amount of ethanol is taken overhead via line 27 which enters the contaminated ether stream of line 11. The alcohol-water bottoms of tower 26 are withdrawn via line 28. If it be desired to produced an ethanol product relatively low in polymer content this stream may be sent directly to alcohol fractionation tower 21 via valve 29 and line 30. If an extremely high purity ethanol free of substantially all traces of polymer is desired, valve 29 may be closed and this bottoms product passed via valve 31 and line 32 to ether extractor 10 where it undergoes purification as previously described.

In a second alternative both valves 5 and 24 remain open and the temperature in heat exchanger 4 is regulated to take overhead via line 25 the lower boiling components of the effluent stream, i.e., those boiling below about 170° F., which enter tower 26 and are processed as previously described while the higher boiling components are removed via line 6 to settler 7 and the ether extraction system first described.

To insure a minimum of alcohol loss it is preferred that the ether fed to ether extractor 10 be saturated with water prior to the extraction.

*Example I*

Diethyl ether and water in a 6 to 1 ether-to-water ratio were fed to a fixed bed reactor (2 inches in diameter and 3 feet in length) containing a commercial grade of alumina catalyst. The reactor was operated at about 615° F. and 200 p.s.i.g. The effluent from the reactor was partially condensed forming only one layer and the alcohol product recovered by conventional fractional distillation. The ethanol product recovered was found to have a very foul odor.

The same effluent was cooled to form two layers and after agitation the lower alcohol layer was drawn off and fractionally distilled. The ethanol thus recovered had a much improved odor. The alcohol yield was essentially the same in the two operations demonstrating that the ether layer removed odor without affecting the yield appreciably.

*Example II*

An ether hydration was carried out as in Example I and the effluent was condensed and recovered in the conventional manner by fractional distillation. The ethanol product was tested by an odor evaluation by an expert wherein the odor was compared with standard odor samples employed by the ethanol trade with numerical ratings of 1 to 12 and found to have a numerical rating of 12+. The odor was worse than low grade ethanols distilled from a sulfuric acid extract of ethylene.

The same effluent was given one ether extraction with a water saturated ether-water solution and the lower alcohol-water layer drawn off and tested as before. It was found, upon examination, that the odor had improved enough to reduce the odor classification to 8.

*Example III*

A diethyl ether-water feed is fed to a reactor as described in Example I. The effluent from the reactor is passed through a heat exchange unit to a settling tank with pump around agitation. Two layers are formed and the lower alcohol-water rich bottom layer is drawn off and pumped to an ether extraction column. Water saturated ether is fed to this column in the ratio of 1 to 5 based on total feed to column and the contents are agitated by a mechanical rotary agitator. The alcohol-water rich bottoms layer is drawn off and sent to another settling tank where two phases are formed. The lower alcohol-water rich layer is drawn off and sent to a fractional distillation column. Highly pure ethanol substantially free of hydrocarbon odor is recovered as a distillate and the water is rejected as bottoms. The ethanol thus recovered is tested and found to have an odor classification of 2 which is accepted in the trade as ethanol of premium quality.

What is claimed is:

1. In a process for producing ethanol from diethyl ether which comprises passing a feed stream of diethyl ether and water under superatmospheric pressures over a hydration catalyst at temperatures in the range of 350° to 800° F., the improvement which comprises dividing said feed stream into a first portion and a second portion, passing said first portion over said catalyst at said temperatures and pressures in a reaction zone, recovering from said reaction zone a vaporous catalytic hydration product containing ethanol, diethyl ether, water and polymeric hydrocarbon impurities, cooling said product to form an ether-rich and an alcohol-rich aqueous phase containing traces of said impurities, separating said alcohol-rich phase from said ether-rich phase, admixing said alcohol-rich aqueous phase and said second portion of said feed stream in a ratio of about 10:1 to 10:4 in an ether extraction zone, removing an ether extract from said extraction zone containing said trace impurities and recovering an aqueous ethanol bottoms from said extraction zone essentially free of said polymeric hydrocarbon impurities.

2. In a process for producing ethanol from diethyl ether which comprises passing a feed stream of diethyl ether and water under superatmospheric pressures over a hydration catalyst at temperatures in the range of 350° to 800° F., the improvement which comprises dividing said feed stream into a first portion and a second portion, passing said first portion over said catalyst at said temperatures and pressures in a reaction zone, recovering from said reaction zone a vaporous catalytic hydration product of diethyl ether containing 25 to 35 vol. percent ethanol, 5 to 15 vol. percent diethyl ether, 55 to 65 vol. percent water and polymeric hydrocarbon impurities, introducing said product into a fractional distillation zone, removing from said distillation zone an overhead stream containing diethyl ether, and an ethanol-water-hydrocarbon azeotrope, removing an alcohol-rich aqueous bottoms from said fractional distillation zone containing traces of said hydrocarbon impurities, admixing said alcohol-rich aqueous phase and said second portion of said feed stream in a ratio of about 10:1 to 10:4 in an ether extraction zone, removing an ether extract from said extraction zone containing said trace impurities and recovering an aqueous ethanol bottoms from said extraction zone essentially free of said polymeric hydrocarbon impurities.

3. In a process for producing ethanol from diethyl ether which comprises passing a feed steam of diethyl ether and water under superatmospheric pressures over a hydration catalyst at temperatures in the range of 350° to 800° F., the improvement which comprises dividing said feed stream into a first portion and a second portion, passing said first portion over said catalyst at said temperatures and pressures in a reaction zone, recovering from said reaction zone a vaporous catalytic hydration product of diethyl ether containing 25 to 35 vol. percent ethanol, 5 to 15 vol. percent diethyl ether, 55 to 65 vol. percent water and polymeric hydrocarbon impurities, cooling said product to form a two-phase condensate comprising an ether-rich upper phase and an alcohol-rich lower phase containing traces of said impurities, admixing said ether-rich phase with said alcohol-rich phase, separating said alchol-rich phase from said ether-rich phase, saturating said second portion of said feed stream with water, admixing said alcohol-rich aqueous phase and said second portion of said feed stream in a ratio of 10:1.5 to 10:3 in an ether extraction zone, removing an ether extract from said extraction zone containing said trace impurities and recovering an aqueous ethanol bottoms from said extraction zone essentially free of said polymeric hydrocarbon impurities.

References Cited in the file of this patent

UNITED STATES PATENTS

| | | |
|---|---|---|
| 1,602,846 | Burke | Oct. 12, 1926 |
| 2,510,806 | Egberts et al. | June 6, 1950 |
| 2,519,061 | Mason | Aug. 15, 1950 |